United States Patent
Kozai et al.

(10) Patent No.: US 10,236,515 B2
(45) Date of Patent: Mar. 19, 2019

(54) ELECTRICALLY CONDUCTIVE MEMBER, CELL STACK DEVICE, MODULE, MODULE HOUSING DEVICE, AND METHOD FOR MANUFACTURING ELECTRICALLY CONDUCTIVE MEMBER

(71) Applicant: KYOCERA Corporation, Kyoto-shi, Kyoto (JP)

(72) Inventors: Takeshi Kozai, Kirishima (JP); Kazunari Sugihara, Kirishima (JP); Tetsuro Fujimoto, Kirishima (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/328,954

(22) PCT Filed: Nov. 6, 2015

(86) PCT No.: PCT/JP2015/081267
§ 371 (c)(1),
(2) Date: Jan. 25, 2017

(87) PCT Pub. No.: WO2016/072485
PCT Pub. Date: May 12, 2016

(65) Prior Publication Data
US 2017/0237076 A1   Aug. 17, 2017

(30) Foreign Application Priority Data
Nov. 6, 2014   (JP) .................. 2014-226153

(51) Int. Cl.
*H01M 8/24*   (2016.01)
*H01M 4/86*   (2006.01)
(Continued)

(52) U.S. Cl.
CPC .......... *H01M 4/8657* (2013.01); *C01G 23/00* (2013.01); *C01G 37/02* (2013.01); *C04B 35/42* (2013.01);
(Continued)

(58) Field of Classification Search
CPC ............. H01M 4/8657; H01M 4/8825; H01M 4/8882; H01M 8/1231; H01M 8/2428;
(Continued)

(56) References Cited

U.S. PATENT DOCUMENTS

| | | | |
|---|---|---|---|
| 8,178,254 | B2 | 5/2012 | Inoue et al. |
| 8,535,844 | B2 | 9/2013 | Ono |

(Continued)

FOREIGN PATENT DOCUMENTS

| | | |
|---|---|---|
| CN | 103946422 A | 7/2014 |
| EP | 2784183 A1 | 10/2014 |

(Continued)

OTHER PUBLICATIONS

International Search Report (Form PCT/ISA/210) dated Feb. 2, 2016 and issued for PCT/JP2015/081267.

*Primary Examiner* — Jane J Rhee
(74) *Attorney, Agent, or Firm* — Viering, Jentschura & Partner MBB

(57) ABSTRACT

An electrically conductive member of the present disclosure includes a base member containing chromium (Cr), and a first layer provided on a surface of the base member and containing chromium(III) oxide ($Cr_2O_3$). The first layer also contains titanium (Ti).

9 Claims, 6 Drawing Sheets

(51) Int. Cl.
- *C01G 23/00* (2006.01)
- *C01G 37/02* (2006.01)
- *C25B 9/04* (2006.01)
- *H01B 5/02* (2006.01)
- *H01M 8/0202* (2016.01)
- *H01M 8/1231* (2016.01)
- *H01M 8/2428* (2016.01)
- *H01M 8/2457* (2016.01)
- *C04B 35/42* (2006.01)
- *C04B 35/622* (2006.01)
- *C04B 35/63* (2006.01)
- *C04B 35/64* (2006.01)
- *H01M 4/88* (2006.01)
- *H01M 8/0208* (2016.01)
- *H01M 8/0228* (2016.01)
- *C22C 19/05* (2006.01)
- *C22C 38/00* (2006.01)
- *C22C 38/28* (2006.01)
- *H01M 8/12* (2016.01)
- *H01M 8/124* (2016.01)

(52) U.S. Cl.
CPC ........ *C04B 35/62222* (2013.01); *C04B 35/63* (2013.01); *C04B 35/64* (2013.01); *C25B 9/04* (2013.01); *H01B 5/02* (2013.01); *H01M 4/8825* (2013.01); *H01M 4/8882* (2013.01); *H01M 8/0202* (2013.01); *H01M 8/0208* (2013.01); *H01M 8/0228* (2013.01); *H01M 8/1231* (2016.02); *H01M 8/24* (2013.01); *H01M 8/2428* (2016.02); *H01M 8/2457* (2016.02); *C04B 2235/3234* (2013.01); *C04B 2235/3243* (2013.01); *C04B 2235/652* (2013.01); *C04B 2235/96* (2013.01); *C22C 19/05* (2013.01); *C22C 38/00* (2013.01); *C22C 38/28* (2013.01); *H01M 8/12* (2013.01); *H01M 2008/1293* (2013.01); *H01M 2300/0077* (2013.01); *Y02P 70/56* (2015.11)

(58) Field of Classification Search
CPC ............. H01M 8/2457; H01M 8/0202; H01M 8/0208; H01M 8/0228; H01M 8/24; H01M 8/12; H01M 2008/1293; H01M 2300/0077

See application file for complete search history.

(56) References Cited

U.S. PATENT DOCUMENTS

| | | |
|---|---|---|
| 2010/0167154 A1 | 7/2010 | Ono |
| 2010/0178587 A1 | 7/2010 | Inoue et al. |
| 2015/0086905 A1 | 3/2015 | Fujimoto et al. |

FOREIGN PATENT DOCUMENTS

| | | |
|---|---|---|
| JP | H08165546 A | 6/1996 |
| JP | H11106892 A | 4/1999 |
| JP | 2007059377 A | 3/2007 |
| JP | 2008081804 A | 4/2008 |
| JP | 2008285731 A | 11/2008 |
| JP | 2011179063 A | 9/2011 |
| WO | 2007083627 A1 | 7/2007 |

US 10,236,515 B2

ELECTRICALLY CONDUCTIVE MEMBER, CELL STACK DEVICE, MODULE, MODULE HOUSING DEVICE, AND METHOD FOR MANUFACTURING ELECTRICALLY CONDUCTIVE MEMBER

RELATED APPLICATIONS

The present application is a national stage entry according to 35 U.S.C. § 371 of PCT application No.: PCT/JP2015/081267 filed on Nov. 6, 2015, which claims priority from Japanese application No.: 2014-226153 filed on Nov. 6, 2014, and is incorporated herein by reference in its entirety.

TECHNICAL FIELD

The present disclosure relates to an electrically conductive member, a cell stack device, a module, a module housing device, and a method for manufacturing an electrically conductive member.

BACKGROUND

In recent years, there have been proposed, as next generation energy sources, various fuel cell modules that include fuel cells capable of generating power using a fuel gas (hydrogen-containing gas) and an oxygen-containing gas (air) in a housing, and various fuel cell devices that include fuel cell modules in an exterior casing (refer to Patent Document 1, for example).

In such cell stack devices that constitute fuel cell devices, an electrically conductive member fabricated from an alloy containing chromium (Cr) that has thermal resistance is disposed between the fuel cells in order to electrically connect the fuel cells in series.

Patent Document 1: Japanese Unexamined Patent Application Publication No. 2007-59377A

SUMMARY

However, in recent years, a need has arisen for a module housing device with enhanced power generation efficiency. An example of such a module is embodied by an electrically conductive member that has enhanced electrical conductivity, and a cell stack device, a module, and a module housing device including this electrically conductive member.

As such, the present disclosure may provide an electrically conductive member that has enhanced electrical conductivity, and a cell stack device, a module, and a module housing device including this electrically conductive member.

The electrically conductive member in a non-limiting embodiment of the present disclosure includes a base member containing chromium (Cr), and a first layer provided on a surface of the base member and containing chromium (III) oxide ($Cr_2O_3$). The first layer also contains titanium (Ti).

A cell stack device in a non-limiting embodiment of the present disclosure includes a plurality of cells, and the electrically conductive member described above disposed between the plurality of cells and electrically connecting adjacent cells among the plurality of cells.

A module in a non-limiting embodiment of the present disclosure includes a housing container and the cell stack device described above housed in the housing container.

Additionally, a module housing device in a non-limiting embodiment of the present disclosure includes an outer case, the module described above housed in the outer case, and an auxiliary device configured to actuate the module housed in the outer case.

Furthermore, a method for manufacturing an electrically conductive member in a non-limiting embodiment of the present disclosure includes preparing a base member containing chromium (Cr) and titanium (Ti), and providing a first layer containing chromium (III) oxide ($Cr_2O_3$) and titanium on a surface of the base member by subjecting the base member to a thermal treatment.

According to the electrically conductive member of the present disclosure, an electrically conductive member with enhanced electrical conductivity can be obtained.

Additionally, the cell stack device, the module, and the module housing device of the present disclosure include the electrically conductive member with enhanced conductivity. As a result, a cell stack device, a module, and a module housing device with enhanced electrical conductivity can be obtained.

Additionally, according to the method for manufacturing an electrically conductive member of the present disclosure, an electrically conductive member with enhanced electrical conductivity can be manufactured.

BRIEF DESCRIPTION OF DRAWINGS

FIG. 4A is a side view schematically illustrating the cell stack device. FIG. 4B is a cross-sectional view illustrating enlarged parts of the area surrounded by broken lines of the cell stack device of FIG. 4A.

DETAILED DESCRIPTION

An electrically conductive member 1 of a non-limiting embodiment will be described using FIG. 1 and FIGS. 2A and 2B.

Figure 1:
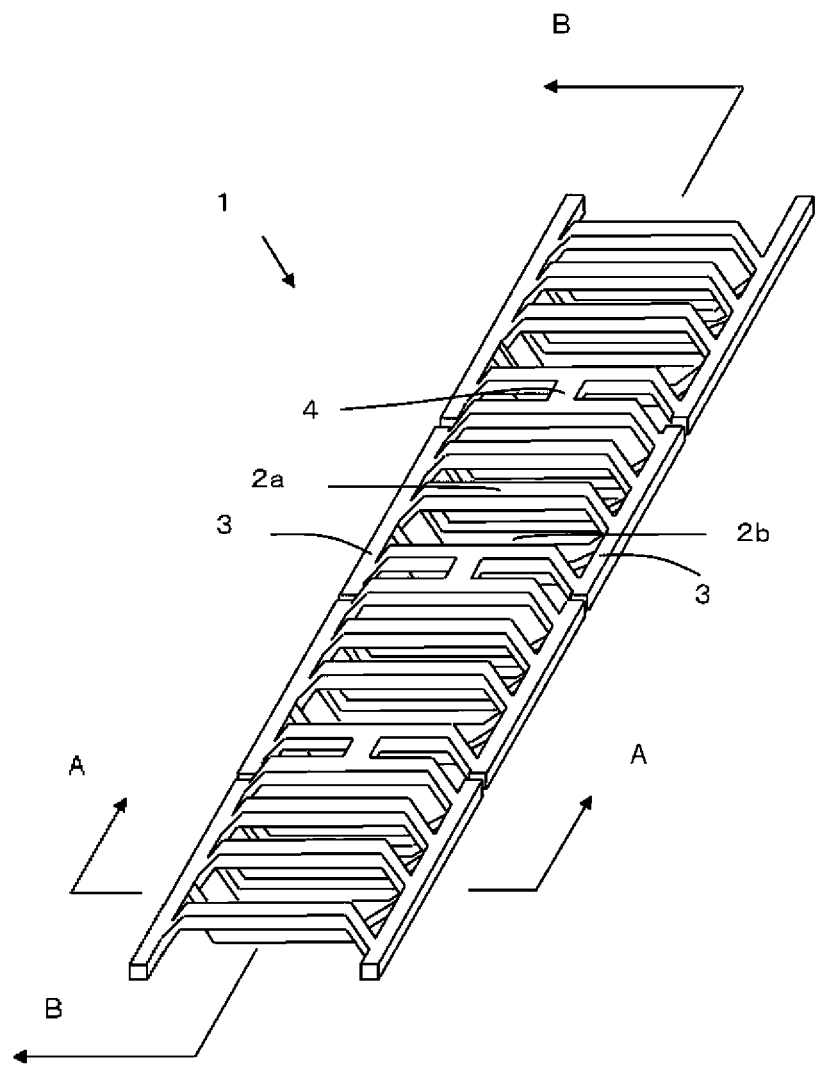
FIG. 1 is a perspective view illustrating an example of an electrically conductive member according to a non-limiting embodiment.
Figure 2A:
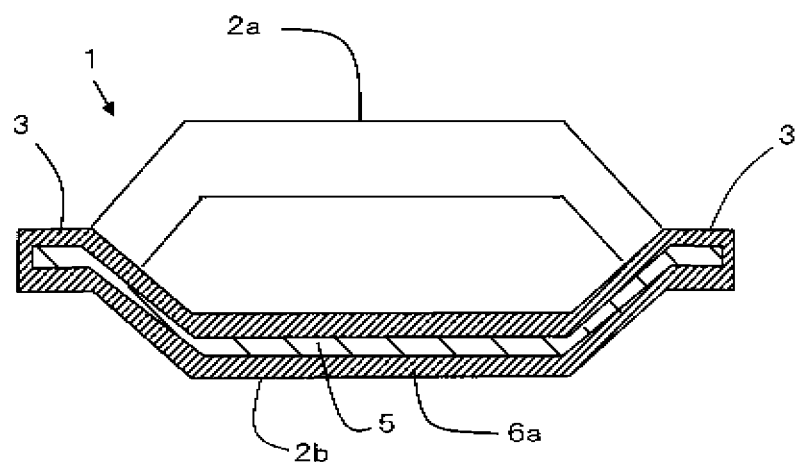
FIG. 2A is an enlarged cross-sectional view taken along line A-A of the electrically conductive member illustrated in FIG. 1.
Figure 2B:
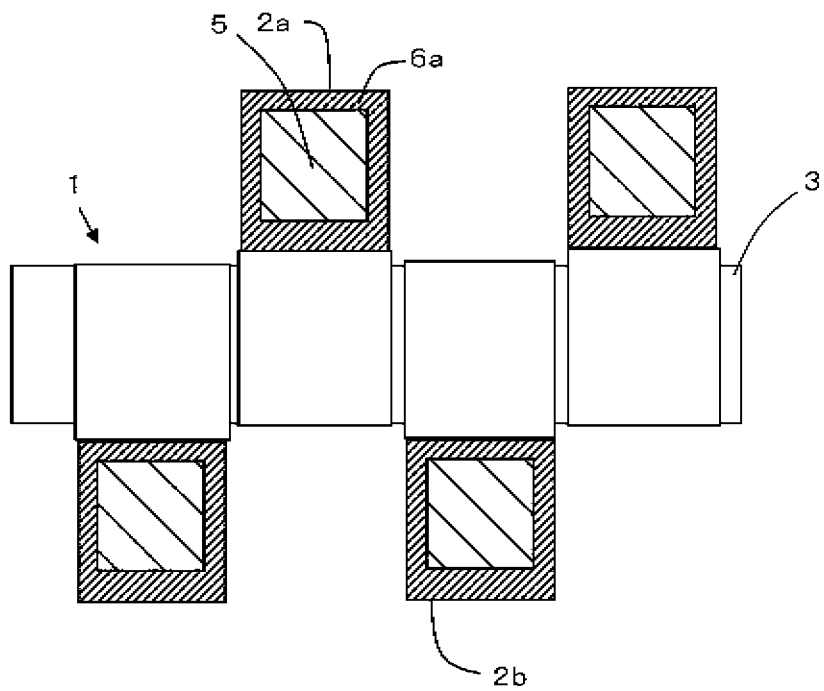
FIG. 2B is an enlarged cross-sectional view illustrating an extracted portion of a cross-section taken along line B-B of the electrically conductive member illustrated in FIG. 1.
Figure 3A:
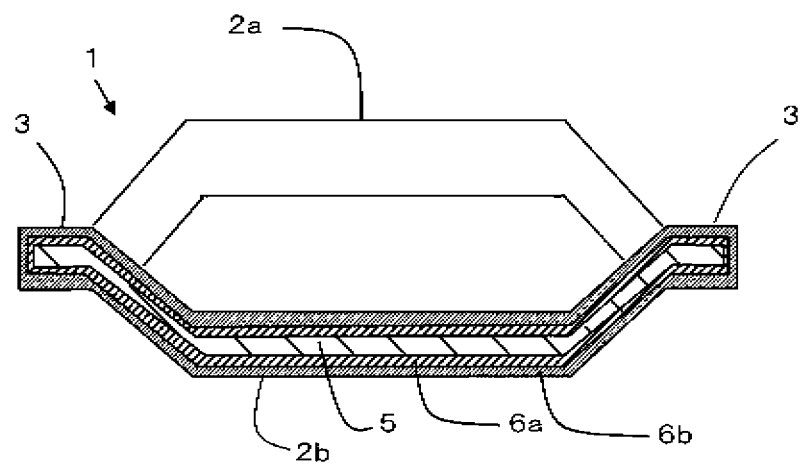
FIGS. 3A and 3B illustrate another example of the electrically conductive member illustrated in FIGS. 2A and 2B, and are enlarged cross-sectional views of the electrically conductive member.
Figure 3B:
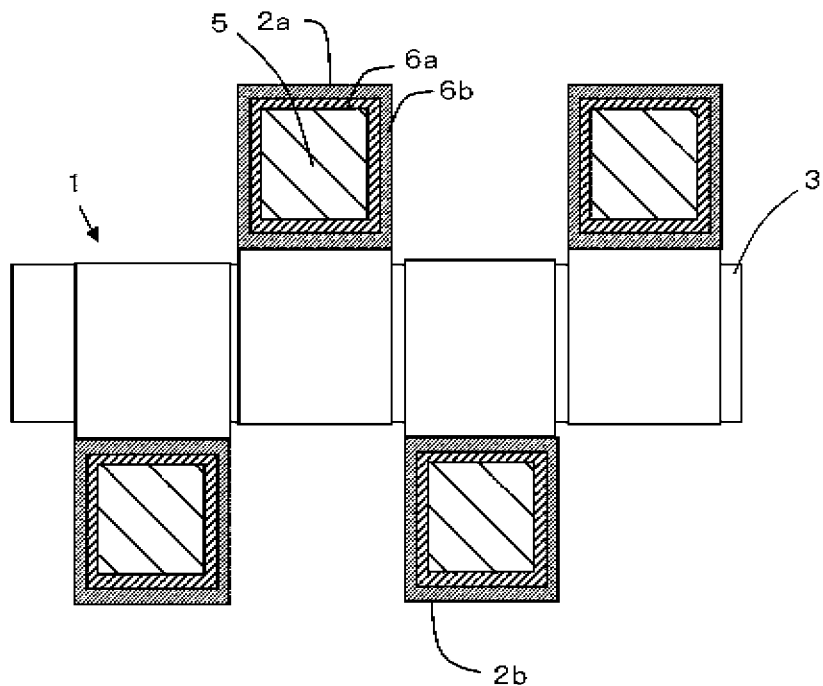

The electrically conductive member 1 illustrated in FIG. 1 is configured to be disposed between adjacent cells among a plurality of cells (not illustrated in FIG. 1 or FIGS. 2A and 2B) in order to electrically connect the adjacent cells with each other. The electrically conductive member 1 is provided with a first joining portion 2a configured to join to a first adjacent cell, a second joining portion 2b configured to join to a second adjacent cell, and connecting portions 3 configured to connect both ends of this pair of joining portions 2a and 2b as a basic configuration. Note that in the following description, fuel cells are used to describe the cells, and a current collection member is constituted from the joining portions 2a and 2b and the connecting portions 3.

More specifically, the current collection member is constituted by alternately bending back and forth, with respect to the connecting portion 3, a plurality of strip-like joining portions 2a and 2b passed between the connecting portions 3 arranged on the left and right. A plurality of this current collection member are connected via electrically conductive linking pieces 4, and the current collection members are continuously formed along a longitudinal direction L of a fuel cell 7. Thus, a linked electrically conductive member 1 is formed.

Note that various types of fuel cells are known as fuel cells, but among these, solid oxide fuel cells are known as fuel cells with good power generation efficiency. Fuel cell devices provided with solid oxide fuel cells can be miniaturized with respect to unit power and can easily perform load following operations in which a variable load is followed, which is needed for household fuel cell devices.

Here, as described later, the solid oxide fuel cell device includes a fuel cell device in a housing container, and the fuel cell device is formed by combining a plurality of solid oxide fuel cells. Fuel gas (hydrogen-containing gas) is supplied to the fuel electrode layers and air (oxygen-containing gas) is supplied to the oxygen electrode layers of each of the fuel cells 7, and power is generated at high temperatures of from 600 to 900° C. As such, the electrically conductive member 1, manifolds 8 that allow the fuel gas to be supplied to the fuel cells 7, and other members are required to have thermal resistance. For this reason, an alloy containing chromium (Cr) is used as a base member of each member.

On the other hand, there is a need for an electrically conductive member with enhanced electrical conductivity when using an alloy containing chromium as the electrically conductive member. As such, as illustrated in FIGS. 2A and 2B, the electrically conductive member 1 of a non-limiting embodiment includes a base member 5 containing chromium, and a first layer 6a provided on a surface of the base member 5. The first layer 6a contains chromium (III) oxide ($Cr_2O_3$). The first layer 6a also contains titanium (Ti). Note that because the first layer 6a contains chromium, the coefficient of thermal expansion of the first layer 6a will be close to the coefficient of thermal expansion of the base member 5 and, as a result, bonding strength with the base member 5 can be enhanced.

The base member 5 included in the electrically conductive member 1 is required to have electrical conductivity and thermal resistance and, as such, is formed from an alloy containing two or more types of metal. For example, the base member 5 contains from 4 to 30 atomic % of chromium in the alloy. A nickel-chromium-based alloy or an iron-chromium-based alloy can be used as the base member 5 containing chromium; and austenitic, ferritic, and austenitic-ferritic stainless steel may be used. Additionally, elements other than chromium that the base member 5 may contain include manganese (Mn) and aluminum (Al).

The first layer 6a on the surface of the base member 5 contains chromium (chromium (III) oxide. The primary component of the first layer 6a is chromium (III) oxide. The first layer 6a contains from 80 to 99.9% of chromium (III) oxide. The method for measuring the content of the chromium (III) oxide is described later. Note that in addition to the chromium (III) oxide, the first layer 6a may also contain manganese and aluminum, which the base member 5 described above may also contain. For example in a case where manganese is included, the first layer 6a may contain a composite oxide of chromium and manganese, namely $MnCr_2O_4$, which is a spinel type crystal.

Moreover, in the electrically conductive member 1 according to a non-limiting embodiment, the first layer 6a contains titanium. As a result of this configuration, the electrical conductivity of the first layer 6a can be enhanced and, in turn, the electrical conductivity of the electrically conductive member 1 can be enhanced. Note that, in order to suppress diffusion of the chromium, a thickness of the first layer 6a is configured to be from 0.1 to 3 µm.

A proportion of the titanium to the chromium contained in the first layer 6a is such that Ti/(Ti+Cr) is not less than 0.1% in a non-limiting embodiment. As a result of this configuration, electrical conductivity can be efficiently enhanced. Note that a scanning transmission electron microscope (STEM) can be used to confirm whether or not the first layer 6a contains titanium. Furthermore, the proportion of the titanium contained in the first layer 6a can be measured by photographing the first layer 6a using the same STEM at a magnification of 3000-times so that the first layer 6a is in the visual field, and subjecting the photograph to energy-dispersive spectroscopy (EDS). For example, the proportion of the titanium may be found by taking measurements at nine locations (described later) in the central portion of the first layer 6a, and using the formula Ti/(Ti+Cr), where Ti and Cr are the measured concentrations of the titanium and the chromium, respectively. Additionally, the proportion of the chromium (III) oxide in the first layer 6a may be found by measuring the concentrations of the titanium and the chromium using the same technique. Specifically, this proportion may be found by calculating the value for Cr/(Ti+Cr).

The "central portion" of the first layer 6a is defined as a portion 30 to 70%, in a thickness direction of the first layer 6a, from a boundary between the base member 5 and the first layer 6a.

The nine measurement locations mentioned above are described below.

First, in order to identify the boundary between the base member 5 and the first layer 6a, mapping of the constituents is confirmed in an area that has been enlarged so that the base member 5 and the first layer 6a are in the visual field. Next, a constituent with differing presences in the base member 5 and the first layer 6a is identified. If this constituent is iron, for example, the boundary between the base member 5 and the first layer 6a can be identified by the mapping of the iron. Note that in the mapping, differences in concentration can be confirmed by the color tone and, therefore, it is also possible to identify the boundary between the base member 5 and the first layer 6a on the basis of differences in concentration.

Next, in order to identify the boundary between the first layer 6a and a second layer 6b described later, mapping of the constituents is confirmed in an area that has been enlarged so that the first layer 6a and the second layer 6b are in the visual field. Next, a constituent with differing presences in the first layer 6a and the second layer 6b is identified. If this constituent is zinc, for example, the boundary between the first layer 6a and the second layer 6b can be identified by the mapping of the zinc. Note that in the mapping, differences in concentration can be confirmed by the color tone and, therefore, it is also possible to identify the boundary between the first layer 6a and the second layer 6b on the basis of differences in concentration. Additionally, as described later, even in cases where an electrically conductive adhesive is provided without providing the second layer 6b on the first layer 6a, the boundary between the first layer 6a and the electrically conductive adhesive can be identified by the method described above. An example of the constituent with differing presences in this case is lanthanum, for example.

The boundaries on both sides of the first layer 6a can be identified in the manner described above. Next, three vertical lines are drawn in the thickness direction from a first boundary of the first layer 6a toward a second boundary of the first layer 6a.

Next, concentrations of the titanium and the chromium at three locations, namely a location 30%, a location 50%, and a location 70% of the thickness from the first boundary side are measured at each of the vertical lines. Thus, concentrations of the titanium and the chromium at a total of nine locations are measured according to the method described above. Averages of these obtained measurement values are defined as the concentrations of the titanium and the chromium.

The concentration of the titanium in the first layer 6a on the base member 5 side in the thickness direction is higher than the concentration of the titanium in the central portion in the thickness direction in a non-limiting embodiment. As a result of this configuration, electrical conductivity at the boundary between the first layer 6a and the base member 5 can be enhanced.

The "base member 5 side in the thickness direction" of the first layer 6a is defined as a portion up to 25% of the thickness from the boundary between the base member 5 and the first layer 6a.

The concentration of the titanium in the first layer 6a on the side opposite the base member 5 in the thickness direction is higher than the concentration of the titanium in the central portion in the thickness direction in a non-limiting embodiment. As a result of this configuration, in cases where, for example, another member is provided on the surface of the first layer 6a, the electrical conductivity at the boundary between this other member and the first layer 6a can be enhanced.

The "side opposite the base member 5 in the thickness direction" of the first layer 6a is defined as a portion up to 25% of the thickness from the boundary between the first layer 6a and the second layer 6b (or the electrically conductive adhesive). In other words, it is a portion up to 75 to 100% of the thickness from the boundary between the base member 5 and the first layer 6a.

The concentration of the titanium in the first layer 6a on the base member 5 side in the thickness direction is higher than the concentration of the titanium on the side opposite the base member 5 in the thickness direction in a non-limiting embodiment. As a result of this configuration, the first layer 6a will include comparatively more titanium on the base material 5 side. Therefore, in cases where the base member 5 includes titanium in addition to the materials described above, bonding force between the first layer 6a and the base member 5 containing titanium can be enhanced.

A method for confirming that "the concentration of the titanium in the first layer 6a on the base member 5 side in the thickness direction is higher than the concentration of the titanium in the central portion in the thickness direction" is described below. First, imaging using a STEM is performed at a magnification of 3000-times so that the first layer 6a is in the visual field. Then, element mapping is performed using EDS. At this time, "the concentration of the titanium in the first layer 6a on the base member 5 side in the thickness direction being higher than the concentration of the titanium in the central portion in the thickness direction" can be visually confirmed from a mapping image showing the concentration distribution of the titanium on the basis of the intensity (count values) of characteristic X-rays. Typically, in mapping, areas of high concentration distribution are shown as warm colors and areas of low concentration distribution are shown as cool colors. Thus, when such a display is used, the base member 5 side in the thickness direction of the first layer 6a is displayed in warmer colors than the central portion.

Another confirmation method other than element mapping will be described. A comparison is performed of the intensity of characteristic X-rays at five locations in the central portion in the thickness direction and at five locations on the base member 5 side in the thickness direction of the first layer 6a. If the intensities of all of the characteristic X-rays on the base member 5 side in the thickness direction of the first layer 6a are higher than the intensities of the characteristic X-rays in the central portion, it can be deemed that the concentration of the titanium on the base member 5 side in the thickness direction of the first layer 6a is higher than the concentration of the titanium in the central portion in the thickness direction.

A method for confirming that "the concentration of the titanium in the first layer 6a on the side opposite the base member 5 in the thickness direction is higher than the concentration of the titanium in the central portion in the thickness direction" is described below. First, a mapping image similar to that described above is obtained. As a result, in the mapping image, the side of the first layer 6a opposite the base member 5 in the thickness direction will be displayed in warmer colors than the central portion in the thickness direction.

A method for confirming that, "the concentration of the titanium in the first layer 6a on the base member 5 side in the thickness direction is higher than the concentration of the titanium in the side opposite the base member 5 in the thickness direction" is described below. First, a mapping image similar to that described above is obtained. As a result, in the mapping image, the base member 5 side of the first layer 6a in the thickness direction will be displayed in warmer colors than the side opposite the base member 5 in the thickness direction.

Additionally, the second layer 6b may be provided on the first layer 6a. The second layer 6b is a layer that includes a zinc oxide, for example. As a result of this configuration, electrical conductivity can be enhanced while suppressing diffusion of the chromium. In this case, the second layer 6b includes not less than 70 mol % in a non-limiting embodiment and not less than 90 mol % of zinc oxide with respect to the total weight in another non-limiting embodiment. As a result of this configuration, electrical conductivity can be enhanced while further suppressing diffusion of the chromium.

Additionally, the second layer 6b may be a layer that contains zinc (Zn), manganese (Mn), and cobalt (Co). As a result of this configuration, electrical conductivity can be enhanced while suppressing diffusion of the chromium.

Additionally, in cases where the second layer 6b contains zinc (Zn), manganese (Mn), and cobalt (Co), an average concentration of the titanium in the entirety of the second layer 6b is lower than an average concentration of the titanium in the entirety of the first layer 6a in a non-limiting embodiment. Bonding force with the first layer 6a containing titanium is enhanced when the second layer 6b contains titanium. On the other hand, an alloy in which zinc, manganese, and cobalt are combined has high electrical conductivity compared to titanium. As such, high electrical conductivity can be maintained by reducing the average concentration of the titanium in the entirety of the second layer 6b.

Here, a method for confirming that "the average concentration of the titanium in the entirety of the second layer 6b is lower than the average concentration of the titanium in the entirety of the first layer 6a" is described below. First, a mapping image similar to that described above is obtained. As a result, in the mapping image, the entirety of the second layer 6b will be shown in cooler colors than the entirety of the first layer 6a.

Another confirmation method other than element mapping will be described. In order to find the average concentration of the titanium in the entirety of the first layer 6a, as described above, the concentrations of the titanium at nine locations in the first layer 6a are measured and the average value thereof is calculated. However, the measurement locations on the vertical lines are set at 15%, 50%, and 85% from the first boundary side. Additionally, the concentration of the titanium at nine locations in the second layer 6b is measured using the same technique as the first layer 6a, and the average value thereof is calculated. Note that in order to identify the boundary between the second layer 6b and the electrically conductive adhesive, one of the elements that is a constituent of the electrically conductive adhesive is mapped. For example, lanthanum is mapped. From the results of the mapping, it can be confirmed that the region where a large amount of lanthanum is distributed is the electrically conductive adhesive, the region free of lanthanum or where a small amount of lanthanum is distributed is the second layer 6b, and the boundary between these two regions is the boundary between the second layer 6b and the electrically conductive adhesive. Thus, if the average value of the nine locations in the second layer 6b is lower than the average value of the nine locations in the first layer 6a, it can be deemed that average concentration of the titanium in the entirety of the second layer 6b is lower than the average concentration of the titanium in the entirety of the first layer 6a.

Note that when providing a layer that includes a zinc oxide as the second layer 6b, it should be noted that pure zinc oxide is an electrically insulating body but $Zn_{1+\delta}O$ is a cation-transmission type n-type semiconductor and, even if an impurity element with high valence is added thereto, still functions as an n-type impurity semiconductor. Here, due to the fact that the zinc in the zinc oxide forms a divalent positive ion, electrical conductivity can be imparted by forming a solid solution with a metal element that forms a trivalent or higher positive ion. Particularly, electrical conductivity can be imparted by forming a solid solution with iron or aluminum, which form trivalent or higher positive ions.

Additionally, the fuel cells and the electrically conductive member 1 may be bonded using an electrically conductive adhesive (not illustrated). Any electrically conductive adhesive may be used provided that it has electrical conductivity in a power generation atmosphere and at a power generation temperature but, particularly, a perovskite composite oxide containing lanthanum (La) may be used in a non-limiting embodiment. Specifically, a $LaFeO_3$-based or $LaMnO_3$-based perovskite oxide may be used in a non-limiting embodiment. Particularly, a perovskite composite oxide that contains lanthanum, cobalt, and iron may be used in a non-limiting embodiment. A thickness of the electrically conductive adhesive is from 1 to 50 µm. Electrical conductivity of the electrically conductive member may be 50 S/cm or greater, alternatively 300 S/cm or greater, and 440 S/cm or greater in another non-limiting embodiment.

When fabricating the electrically conductive member 1 described above, a base member 5 is prepared that contains, with respect to the alloy, from 4 to 30 atomic % of chromium, from 70 to 96 atomic % of nickel or iron, and from 0.05 to 0.5 atomic % of titanium. Then, this base member 5 is subjected to a thermal treatment. For example, the base member 5 is subjected to thermal treatment at 800 to 1050° C. for two hours. As a result, the chromium contained in the base member 5 precipitates to the surface of the base member 5 and oxidizes, thus producing a first layer containing chromium (III) oxide, and the titanium that has likewise precipitated from the base member 5 is included in the first layer 6a. Note that to adjust the concentration of titanium in the first layer 6a, appropriate adjustments can be made by adjusting the temperature and the time of the thermal treatment in addition to adjusting the amount of titanium contained in the base member 5.

Additionally, the first layer 6a can be directly provided on the base member 5. In this case, a base member 5 is prepared that contains chromium, and nickel or iron. Then, chromium (III) oxide powder, titanium dioxide powder, and a binder are mixed, and this mixture is coated on the surface of the base member 5. Then, the base member 5 is fired in a reduction atmosphere at a temperature of 1500° C. for two hours. Thus, the first layer 6a can be directly provided on the base member 5.

Next, using FIGS. 4A and 4B, a fuel cell stack device, which is an example of the cell stack device according to a non-limiting embodiment will be described.

Figure 4A:
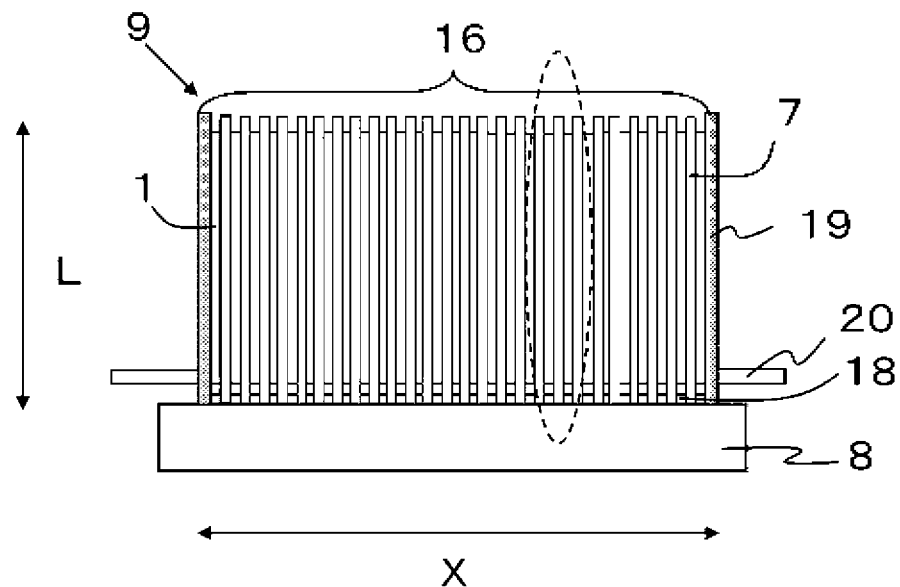
FIGS. 4A and 4B illustrate an example of a cell stack device according to a non-limiting embodiment.
Figure 4B:
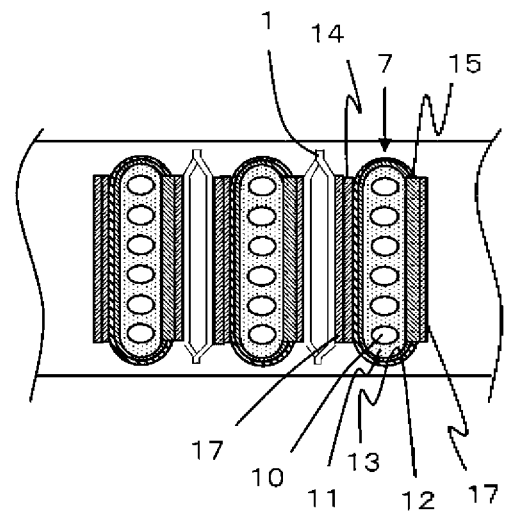

FIGS. 4A and 4B illustrate an example of the cell stack device according to a non-limiting embodiment. FIG. 4A is a side view schematically illustrating the cell stack device. FIG. 4B is a cross-sectional view illustrating enlarged parts of the area surrounded by broken lines of the cell stack device of FIG. 4A.

The cell stack device 9 illustrated in FIGS. 4A and 4B includes a cell stack 16 including a plurality of columnar fuel cells 7. Each fuel cell 7 includes gas-flow passages 10 in its interior, and is formed by layering a fuel electrode layer 12, serving as an inner electrode layer, a solid electrolyte layer 13, and an air electrode layer 14, serving as an outer electrode layer, in that order on one flat face of an overall columnar electrically conductive support body 11 that has a flat cross-section having a pair of opposing flat faces, and layering an interconnector 15 to a part of the other flat face where the air electrode layer 14 is not formed. The fuel cells 7 are electrically connected to each other in series by interposing the electrically conductive members 1 of a non-limiting embodiment between adjacent fuel cells 7. Note that an electrically conductive adhesive 17 is disposed on an outer surface of the interconnector 15 and an outer surface of the air electrode layer 14. By connecting the electrically conductive member 1 to the air electrode layer 14 and the interconnector 15 using the adhesive 17, the contact between those elements becomes ohmic contact, reducing a drop in potential and effectively suppressing a drop in electrical conductivity performance.

A lower end of each fuel cell 7 that constitutes the cell stack 16 is fixed, with a sealing member 18 such as glass, to a manifold 8 for allowing a reactive gas to be supplied to the fuel cell 7 via the gas-flow passages 10.

Additionally, elastically deformable electrically conductive end member 19 whose lower end are fixed to the manifold 8 are provided sandwiching the cell stack 16 from both ends in a direction (the X direction in FIG. 1) in which the fuel cells 7 are arranged, with the electrically conductive members 1 interposed between the electrically conductive end member 19 and the fuel cells 7. Here, in the electrically conductive end member 19 illustrated in FIG. 4A, a current extracting member 20 is provided for extracting electrical current generated by the power generation of the cell stack 16 (the fuel cells 7) with a shape extending outward in the direction in which the fuel cells 7 are arranged.

In the fuel cell stack device 9 configured as described above, the electrically conductive member 1 with enhanced electrical conductivity is provided and, as such, a fuel cell stack device 9 with enhanced electrical conductivity and, in turn, power generation efficiency can be obtained.

Each member constituting the fuel cell 7 illustrated in FIGS. 4A and 4B will be described next.

A well-known conventional material can be used for the fuel electrode layer 12. For example, the fuel electrode layer 12 can be formed of $ZrO_2$ (referred to as a stabilized zirconia that also includes partially stabilized zirconia) forming solid solution with a porous electrically conductive ceramic such as a rare earth element and Ni and/or NiO.

The solid electrolyte layer 13 is required to function as an electrolyte that allows electrons to move between the electrodes and have a gas blocking property that prevents fuel gas and oxygen-containing gas leaks. The solid electrolyte layer 13 is formed of $ZrO_2$ forming solid solution with from 3 to 15 mol % of a rare earth element. Note that the solid electrolyte layer 13 may be formed of another material as long as that material exhibits the abovementioned properties.

The material for the air electrode layer 14 is not particularly limited, and any well-known conventional material may be used. For example, the air electrode layer 14 may be formed of an electrically conductive ceramic made from a so-called $ABO_3$ perovskite oxide. The air electrode layer 14 is required to be gas-permeable, and the open porosity of the air electrode layer 14 is 20% or greater and particularly in the range of 30 to 50% in a non-limiting embodiment.

The interconnector 15 can be formed from electrically conductive ceramics, but because the interconnector 15 makes contact with the fuel gas (hydrogen-containing gas) and oxygen-containing gas (air or the like), the interconnector 15 is required to be reduction resistant and oxidation resistant. As such, a lanthanum chromite perovskite oxide ($LaCrO_3$ oxide) is suitable for use as the interconnector 15. The interconnector 15 is required to be dense in order to prevent leaks of the fuel gas flowing through the plurality of gas-flow passages 10 formed in the electrically conductive support body 11 as well as leaks of the oxygen-containing gas flowing outside the electrically conductive support body 11. Thus, the interconnector 15 has a relative density of 93% or greater and particularly 95% or greater in a non-limiting embodiment.

The electrically conductive support body 11 is required to be gas-permeable to allow the fuel gas to permeate through to the fuel electrode layer 12 and is required to also be electrically conductive in order to allow current collection via the interconnector 15. Therefore, it is necessary to use a material that satisfies these requirements, and as such, a material such as an electrically conductive ceramic or cermet can be used for the electrically conductive support body 11. For production of the fuel cells 7, if the electrically conductive support body 11 is produced by simultaneous firing with the fuel electrode layer 12 or the solid electrolyte layer 13, the electrically conductive support body 11 is formed of an iron group metal component and a specific rare earth oxide ($Y_2O_3$, $Yb_2O_3$, or the like) in a non-limiting embodiment. Additionally, to ensure a desired gas permeability, the electrically conductive support body 11 has an open porosity of 30% or greater and particularly in the range of 35 to 50% in a non-limiting embodiment. The electrically conductive support body 11 also has an electrical conductivity of 300 S/cm or greater and particularly 440 S/cm or greater in a non-limiting embodiment.

Although not illustrated in the drawings, an intermediate layer may be formed between the solid electrolyte layer 13 and the air electrode layer 14 with the aim of strengthening the bond between the solid electrolyte layer 13 and the air electrode layer 14 and suppressing the formation of a reactive layer with high electric resistance due to a reaction between the components of the solid electrolyte layer 13 and the components of the air electrode layer 14.

The intermediate layer can be formed by a composition that contains Cerium (Ce) and another rare earth element. The intermediate layer has a composition expressed by, for example,

$$(CeO_2)_{1-x}(REO_{1.5})_x, \quad (1):$$

where RE represents at least one of Sm, Y, Yb, and Gd, and x represents a number satisfying $0<x\leq 0.3$ in a non-limiting embodiment.

Furthermore, in order to reduce the electric resistance, Sm or Gd is used as RE in a non-limiting embodiment. For example, the intermediate layer is formed of a $CeO_2$ forming solid solution with from 10 to 20 mol % of $SmO_{1.5}$ or $GdO_{1.5}$ in a non-limiting embodiment.

Additionally, the intermediate layer can be formed of two layers in order to strongly bond the solid electrolyte layer 13 with the air electrode layer 14 and further suppress the formation of a reaction layer having a high electric resistance due to a reaction between components of the solid electrolyte layer 13 and components of the air electrode layer 14.

Additionally, although not illustrated, a cohesion layer for reducing, for example, a difference in thermal expansion coefficients between the interconnector 15 and the electrically conductive support body 11 may also be provided between the interconnector 15 and the electrically conductive support body 11.

A composition similar to that of the fuel electrode layer 12 can be used as the cohesion layer. For example, the cohesion layer can be formed of $ZrO_2$ (called stabilized zirconia) forming solid solution with a rare earth element such as YSZ and Ni and/or NiO. Note that the $ZrO_2$ forming solid solution with the rare earth element and the Ni and/or NiO are set to a volume ratio in a range of 40:60 to 60:40 in a non-limiting embodiment.

Figure 5:
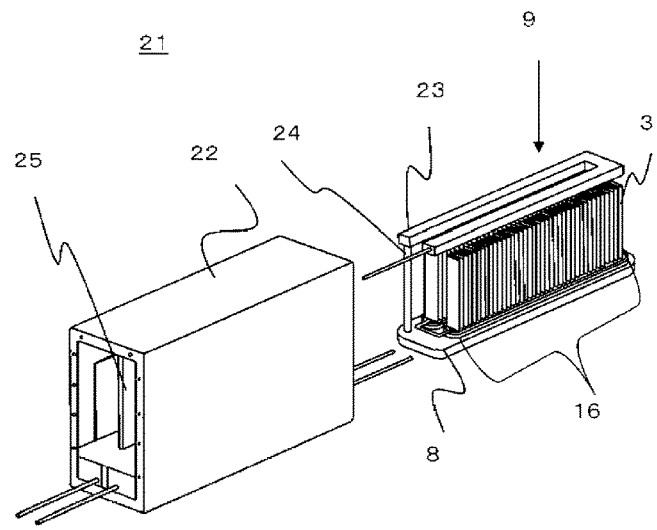
FIG. 5 is an exterior perspective view illustrating an example of a module according to a non-limiting embodiment.

FIG. 5 is an exterior perspective view illustrating a module, namely a fuel cell module, (hereinafter referred to as a "module"), configured to house the fuel cell stack device 9, which is an example of a non-limiting embodiment.

In FIG. 5, the module 21 includes the fuel cell stack device 9 housed inside a rectangular cuboid-shaped housing 22.

In FIG. 5, in order to obtain the fuel gas to be used in the fuel cells 7, a reformer 23 for generating fuel gas by reforming raw materials such as natural gas and kerosene is disposed above the cell stack 16. Then, the fuel gas produced in the reformer 23 is supplied to the manifold 8 via a fuel gas leading-out pipe 24. The fuel gas is then supplied via the manifold 8 to the gas-flow passages 10 formed inside the fuel cells 7.

Additionally, FIG. 5 illustrates a state in which a part (the front and rear surfaces) of the housing container 22 is detached and the fuel cell stack device 9 and the reformer 23 housed in the interior are taken out to the rear. Here, in the module 21 illustrated in FIG. 5, the fuel cell stack device 9 can be slid into and housed in the housing 22. Note that, the fuel cell stack device 9 may include the reformer 23.

In addition, in FIG. 5, an oxygen-containing gas introducing member 25 disposed in the housing container 22 is arranged between the cell stacks 16 juxtaposed on the manifold 8, and oxygen-containing gas (air) is supplied to the lower ends of the fuel cells 7 such that the flow of the oxygen-containing gas is synchronized with the flow of the fuel gas so as to flow at the sides of the fuel cell 7 from the bottom portions toward the top portions. Then, by combusting the fuel gas discharged from the gas-flow passages 10 of the fuel cell 7 with the oxygen-containing gas at the top portion side of the fuel cell 7, the temperature of the fuel cell 7 can be increased and the activation of the fuel cell stack device 9 can be sped up. In addition, the reformer 23 disposed above the fuel cells 7 (the cell stack 16) can be heated by combusting the fuel gas discharged from the gas-flow passages 10 of the fuel cells 7 at the upper end side in a longitudinal direction L of the fuel cells 7. This allows an efficient reforming reaction performed in the reformer 23.

In the module 21 configured as described above, the fuel cell stack device 9 with enhanced electrical conductivity is provided and, as such, a module 21 with enhanced electrical conductivity and, in turn, power generation efficiency can be obtained.

Figure 6:
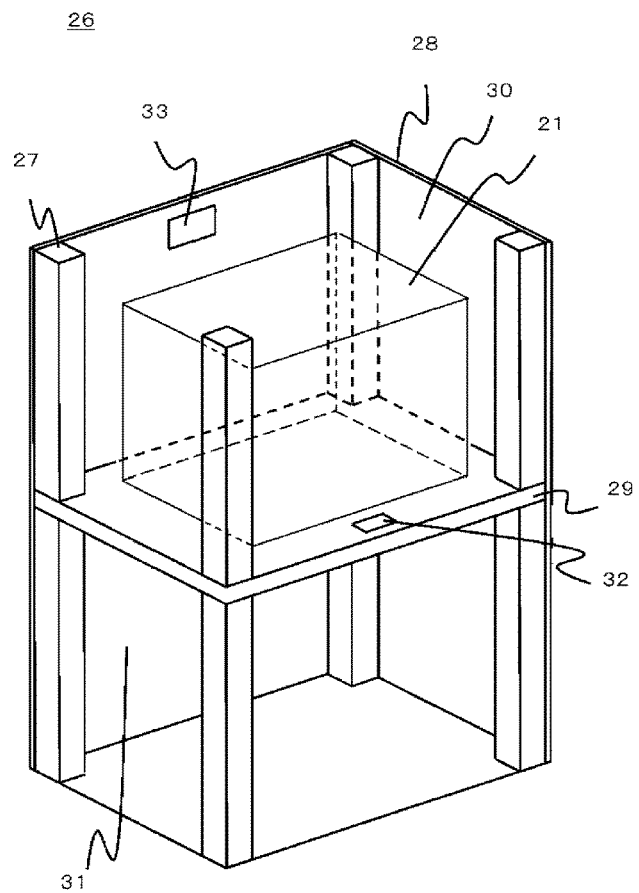
FIG. 6 is an exploded perspective view schematically illustrating an example of a module housing device according to a non-limiting embodiment.

FIG. 6 is an exploded perspective view illustrating a fuel cell device 26, which is a module housing device formed by housing the module 21 illustrated in FIG. 5 in an exterior casing. Note that some of the components of the configuration are not illustrated in FIG. 6.

In the fuel cell device 26 illustrated in FIG. 6, an external casing formed using supports 27 and exterior plates 28 is divided into an upper and a lower region using a dividing plate 29. The upper region forms a module housing chamber 30 that houses the module 21. The lower region forms an auxiliary device housing chamber 31 that houses auxiliary devices configured to actuate the module 21. Note that the auxiliary devices housed in the auxiliary device housing chamber 31 are not illustrated in FIG. 6.

Furthermore, an airflow hole 32 for allowing air in the auxiliary device housing chamber 31 to flow into the module housing chamber 30 is formed in the dividing plate 29, and an exhaust hole 33 for exhausting air out of the module housing chamber 30 is formed in one of the outer plates 28 of the module housing chamber 30.

In the fuel cell device 26 configured as described above, in the module 21 configured as described above, the module 21 with enhanced electrical conductivity is provided and, as such, a fuel cell device 26 with enhanced electrical conductivity and, in turn, power generation efficiency can be obtained.

The present disclosure has been described in detail above. However, the present disclosure is not limited to the embodiments described above, and various modifications or improvements can be made without departing from the essential spirit of the present disclosure.

For example, although the above embodiments describe the fuel cell 7, the fuel cell stack device 9, the module 21, and the fuel cell device 26, a non-limiting embodiments can also be applied in an electrolytic cell (SOEC) that generates hydrogen and oxygen ($O_2$) by electrolyzing water vapor (water) by applying water vapor and voltage to a cell, and can also be applied to an electrolytic cell stack device, an electrolytic module, and an electrolytic device provided with this electrolytic cell.

EXAMPLES

Chromium (III) oxide powder, titanium dioxide powder, and a binder were mixed, and this mixture was fired in a reduction atmosphere at a temperature of 1500° C. for two hours. Thus, 20×5×5 mm samples of first layers were fabricated. At this time, the chromium (III) oxide powder was added so that the proportions of titanium contained in the first layer in terms of Ti/(Ti+Cr) were the amounts shown in FIG. 7. Note that a transmission electron microscope was used to confirm that the sample to which the chromium (III) oxide was added included a first layer containing titanium.

The electrical conductivity of each of the obtained samples was measured in a reduction atmosphere using a four-terminal method so as to find the electrical conductivity of each sample at each temperature. The results thereof are shown with the electrical conductivity shown as the log on the vertical axis and 1000/absolute temperature shown on the horizontal axis. Note that in the graph, temperatures decrease to the right and electrical conductivity increases upward.

Figure 7:
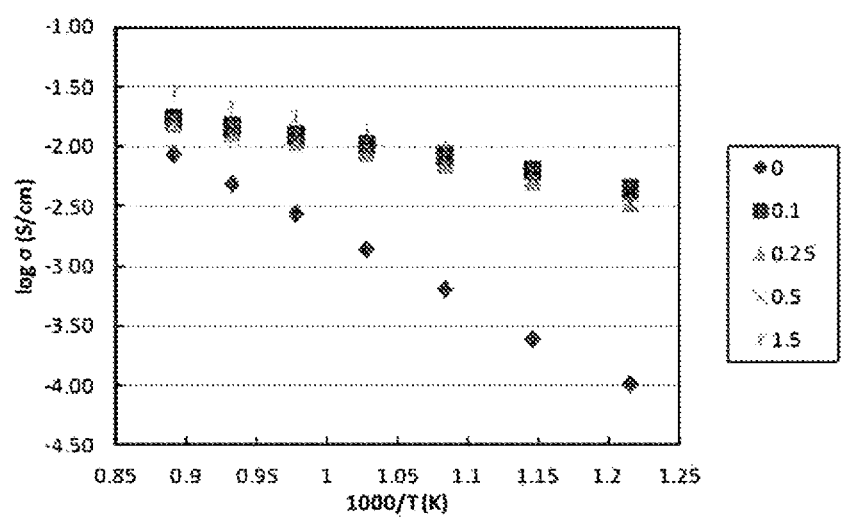
FIG. 7 is a graph showing results of measuring electrical conductivity when changing the content of titanium with respect to chromium (III) oxide.

As shown in FIG. 7, compared to the sample that did not contain titanium dioxide, in the samples where the first layer contained titanium (where the proportion of titanium contained in the first layer in terms of Ti/(Ti+Cr) was not less than 0.1%), electrical conductivity was higher, particularly in the low-temperature region (the right-side of the graph). Thus, it was confirmed that the electrical conductivity enhanced due to the fact that the first layer contained titanium.

REFERENCE SIGNS LIST

1 Electrically conductive member
5 Base material
6a First layer
6b Second layer
9 Fuel cell stack device
21 Fuel cell module
26 Fuel cell device

What is claimed is:

1. An electrically conductive member comprising:
a base member comprising chromium (Cr);
a first layer provided on a surface of the base member and comprising chromium(III) oxide ($Cr_2O_3$),
wherein
the first layer also comprises titanium (Ti);
a second layer is provided on the first layer and comprises zinc (Zn), manganese (Mn), and cobalt (Co); and
a concentration of titanium in an entirety of the second layer is lower than an average concentration of the titanium in an entirety of the first layer.

2. The electrically conductive member according to claim 1,
wherein
a proportion of the titanium in the first layer with respect to the chromium is not less than 0.1% in terms of Ti/(Ti+Cr).

3. The electrically conductive member according to claim 1, wherein,
in the first layer, a concentration of the titanium on a side of the base member in a thickness direction is higher than a concentration of the titanium in a central portion in the thickness direction.

4. The electrically conductive member according to claim 1, wherein,
in the first layer, a concentration of the titanium on a side opposite the base member in the thickness direction is higher than the concentration of the titanium in the central portion in the thickness direction.

5. The electrically conductive member according to claim 1, wherein,
in the first layer, the concentration of the titanium on the side of the base member in the thickness direction is higher than the concentration of the titanium on the side opposite the base member in the thickness direction.

6. A cell stack device comprising:
a plurality of cells; and
the electrically conductive member according to claim 1 disposed between the plurality of cells and electrically connecting adjacent cells among the plurality of cells.

7. A module comprising:
a housing container; and
the cell stack device according to claim 6 housed in the housing container.

8. A module housing device comprising:
an outer case;
the module according to claim 7 housed in the outer case; and
an auxiliary device configured to actuate the module housed in the outer case.

9. A method for manufacturing an electrically conductive member, the method comprising:
preparing a base member comprising chromium (Cr) and titanium (Ti);
providing a first layer comprising chromium(III) oxide ($Cr_2O_3$) and titanium on a surface of the base member by subjecting the base member to a thermal treatment; and
providing a second layer comprising zinc (Zn), manganese (Mn), and cobalt (Co) on the first layer;
wherein
a concentration of titanium in an entirety of the second layer is lower than an average concentration of the titanium in an entirety of the first layer.

* * * * *